US007653243B2

(12) United States Patent
Grady

(10) Patent No.: US 7,653,243 B2
(45) Date of Patent: Jan. 26, 2010

(54) SYSTEM AND METHOD FOR 3D VOLUME SEGMENTATION USING EXACT MINIMAL SURFACES GIVEN A BOUNDARY

(75) Inventor: Leo Grady, Yardley, PA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 691 days.

(21) Appl. No.: 11/511,524

(22) Filed: Aug. 28, 2006

(65) Prior Publication Data

US 2007/0086647 A1 Apr. 19, 2007

Related U.S. Application Data

(60) Provisional application No. 60/726,717, filed on Oct. 14, 2005.

(51) Int. Cl.
*G06K 9/34* (2006.01)
(52) U.S. Cl. .................................................. 382/173
(58) Field of Classification Search .................. 382/173
See application file for complete search history.

(56) References Cited

OTHER PUBLICATIONS

Shi et al., Adaptive Stereo Brain Images Segmentation Based on the Weak Membrane Model, Sep. 2004, Springer-Verlag Berlin Heidelberg, pp. 601-606.*

Poggio et al., Parallel Integration of Vision Modules, Science, New Series, Oct. 21, 1988, vol. 242, No. 4877, pp. 436-440.*
Geman et al., Stochastic Relaxation, Gibbs Distributions, and the Bayesian Restoration of Images, Nov. 1984, IEEE Transactions on Pattern Analysis and Machine Intelligence, Vo. PAMI-6, No. 6, pp. 721-741.*

* cited by examiner

*Primary Examiner*—Bhavesh M Mehta
*Assistant Examiner*—Dennis Rosario
(74) *Attorney, Agent, or Firm*—Donald B. Paschburg; F. Chau & Associates, LLC

(57) ABSTRACT

A method for 3D volume segmentation in digitized medical images includes providing a digitized medical image defined on an N-dimensional lattice, obtaining an oriented closed 2-dimensional contour on one or more 2-dimensional slices from said image, defining face weights w from said image intensities by forming a dual lattice of said image lattice, minimizing $$\sum_i w_i z_i$$

summed over all faces subject to the constraint $Bz=r$ wherein vector z is an indicator vector indicating whether a face is present in a minimum-weight surface, vector r is an indicator vector of said 2-D contour, and wherein B is an edge-face incidence matrix, and segmenting said 3-D image into distinct regions separated by the minimum-weight surface indicated by said vector z.

21 Claims, 5 Drawing Sheets

(a)    (b)    (c)    (d)    (e)    (f)

SYSTEM AND METHOD FOR 3D VOLUME SEGMENTATION USING EXACT MINIMAL SURFACES GIVEN A BOUNDARY

CROSS REFERENCE TO RELATED UNITED STATES APPLICATIONS

This application claims priority from "Volume Segmentation Using Exact Minimal Surfaces Given a Boundary: Intelligent Scissors in 3D", U.S. Provisional Application No. 60/726,717 of Leo Grady, filed Oct. 14, 2005, the contents of which are incorporated herein by reference.

TECHNICAL FIELD

This invention is directed to the segmentation of 3-dimensional (3D) volumetric digital medical images.

DISCUSSION OF THE RELATED ART

Minimal surfaces have found increasing use in image segmentation. However, there are three distinct approaches in the current situation. Specifically, algorithms may be grouped according to whether: (1) fixed conditions, if any, are interior to the region or on the boundary; (2) the desired minimal surface is a continuum surface (necessarily discretized for computation), or defined directly on the image data, as a finite, combinatorial, space; or (3) the desired output is the Euclidean minimal surface in the presence of additional forces/constraints, or whether the desired output is the minimal surface with respect to an unusual metric (e.g., as imposed by the image content).

Within the vision community, attention has been focused either on continuum minimal surfaces under the presence of additional forces/constraints, such as active contours and level sets, or upon combinatorial minimal surfaces defined on a simplicial complex, with a metric imposed by the image content. For example, the graph cuts approach produces minimal surfaces with respect to an image-dependent metric represented by the graph weights given internal boundary conditions, which is equivalent to finding the minimal surface that separates two sets of fixed nodes, where the fixed nodes are given by the user in the form of seeds. Similarly, the intelligent scissors method finds the minimal (1D) surface on a 2D weighted graph, given user-indicated pieces of the boundary.

Since minimal surfaces have been studied extensively outside of computer vision in the fields of geometric measure theory and variational calculus, the term minimum-weight surfaces will be used herein below to refer to minimal surfaces defined on the space of discrete, weighted lattices. Although lattices are the most relevant structure for computer vision, the techniques developed herein can be applied to more general discrete structures.

Shortest path algorithms on weighted graphs have found many applications in computer vision, including segmentation, video summarization, perceptual grouping and solving PDEs. Since computer vision techniques have been increasingly applied to 3D data in the context of video sequences or medical acquisitions, researchers have looked for 3D extensions of many conventional 2D techniques. Although a shortest path may be found in a 3D weighted graph, the character of the path as an object boundary in 2D is not preserved in 3D. Specifically, a 3D object boundary is necessarily a (2D) surface. Therefore, extension of a shortest path approach to 3D requires computation of an appropriate surface when the character of the path as boundary is important.

The specification of a shortest path requires certain constraints in order to avoid a null-path solution. These constraints are typically included in one of two ways:

(1) The shortest path is required to enclose one specified region of space while excluding a second specified region (i.e., separating the two regions); or (2) The shortest path is required to have a specified boundary (i.e., endpoints).

These methods for specifying constraints for the minimal surface problem will be referred to herein as Type I and Type II constraints, respectively. Type I constraints give rise to a source separation problem that can be solved efficiently on discrete spaces by, e.g., a max-flow/min-cut algorithm. Type II constraints give rise to a source connection problem that can be solved efficiently on discrete spaces by Dijkstra's algorithm.

Type I and Type II constraints are used in the specification of minimum-weight surfaces in order to avoid the null solution. The minimum-weight surface with Type I constraints is equivalent to solving the max-flow/min-cut in 3D, which has known solutions in both continuous and discrete spaces. Type II constraints require that the minimum-weight surface have a prescribed boundary. Surface boundaries are defined by closed contours, an example of which is the wire rim giving the boundary of a soap bubble. The minimum-weight surface with Type II constraints has been studied in continuous space as Plateau's problem, but there is very limited work on minimal surfaces with Type II constraints in discrete space.

SUMMARY OF THE INVENTION

Exemplary embodiments of the invention as described herein generally include methods and systems for the computation of minimum-weight surfaces in 3D weighted graphs with Type II constraints. Since an object boundary in three dimensions is a 2D surface, a discrete minimal surface computation can extend a shortest path approach to 3D data in applications where the character of the path as a boundary is important. This minimal surface problem can extend the intelligent scissors/live wire segmentation algorithm to 3D. The segmentation can be formulated as a linear programming system that can be solved efficiently with standard solvers. Further embodiments of the invention can be applied to the computation of minimum-weight surfaces in higher dimension datasets, such as 4D datasets that include 3D datasets evolving over time.

According to an aspect of the invention, there is provided a method for 3D volume segmentation in digitized medical images, including providing a digitized medical image, said image comprising a plurality of intensities corresponding to a domain of points on an N-dimensional lattice, obtaining an oriented closed 2-dimensional contour on one or more 2-dimensional slices from said image, defining face weights w from said image intensities by forming a dual lattice of said image lattice, minimizing $$\sum_i w_i z_i$$

summed over all faces subject to the constraint $Bz=r$ wherein vector $z$ is an indicator vector indicating whether a face is present in a minimum-weight surface, vector $r$ is an indicator vector of said 2-D contour, and wherein $B$ is an edge-face incidence matrix, and segmenting said 3-D image into distinct regions separated by the minimum-weight surface indicated by said vector z.

According to a further aspect of the invention, the weight of an outside face is assigned arbitrarily.

According to a further aspect of the invention, the edge-face incidence matrix B is defined by $$B_{e,f} = \begin{cases} +1 & \text{if the edge borders the face with coherent orientation,} \\ -1 & \text{if the edge borders the face with anti-coherent orientation,} \\ 0 & \text{otherwise.} \end{cases}$$

According to a further aspect of the invention, the contour indicator vector r is defined by $$r_i = \begin{cases} +1 & \text{if the edge } e_i \text{ belongs to the contour with coherent orientation,} \\ -1 & \text{if the edge } e_i \text{ belongs to the contour with anti-coherent orientation,} \\ 0 & \text{otherwise.} \end{cases}$$

According to a further aspect of the invention, wherein every point in said primal lattice is associated with a volume in said dual lattice, and further comprising associating the intensity value of each primal lattice point with a point at the center of the corresponding dual lattice volume.

According to a further aspect of the invention, the weights $w_i$ are proportional to $\exp(-\beta(I_j - I_k)^2)$, wherein $I_j$ and $I_k$ represent the values associated with dual lattice points j and k, respectively, and $\beta$ is a predefined constant.

According to a further aspect of the invention, the minimization of $$\sum_i w_i z_i$$

subject to Bz=r is performed by a linear programming solver.

According to a further aspect of the invention, the method comprises obtaining a plurality of contours from said image, wherein each said contour extends over one or more 2-dimensional slices in said image, and wherein said vector r is an indicator vector for all of said plurality of contours.

According to another aspect of the invention, there is provided a program storage device readable by a computer, tangibly embodying a program of instructions executable by the computer to perform the method steps for 3D volume segmentation in digitized medical images.

DETAILED DESCRIPTION OF THE PREFERRED EMBODIMENTS

Figure 1:
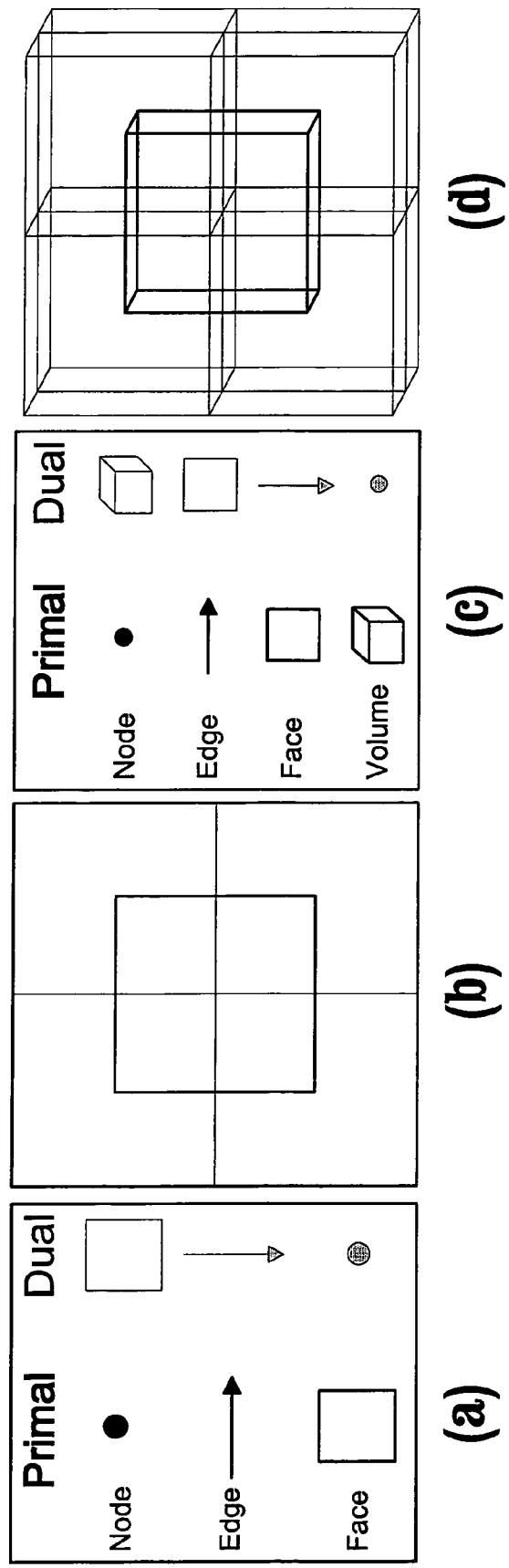
FIGS. 1(a)-(d) illustrate the relationship between the primal and dual complexes in two and three dimensions, according to an embodiment of the invention.

Exemplary embodiments of the invention as described herein generally include systems and methods for the computation of minimum-weight surfaces in 3D weighted graphs with Type II constraints. Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

As used herein, the term "image" refers to multi-dimensional data composed of discrete image elements (e.g., pixels for 2-D images and voxels for 3-D images). The image may be, for example, a medical image of a subject collected by computer tomography, magnetic resonance imaging, ultrasound, or any other medical imaging system known to one of skill in the art. The image may also be provided from non-medical contexts, such as, for example, remote sensing systems, electron microscopy, etc. Although an image can be thought of as a function from $R^3$ to R, the methods of the inventions are not limited to such images, and can be applied to images of any dimension, e.g. a 2-D picture or a 3-D volume. For a 2- or 3-dimensional image, the domain of the image is typically a 2- or 3-dimensional rectangular array, wherein each pixel or voxel can be addressed with reference to a set of 2 or 3 mutually orthogonal axes. The terms "digital" and "digitized" as used herein will refer to images or volumes, as appropriate, in a digital or digitized format acquired via a digital acquisition system or via conversion from an analog image.

The notation used herein below is defined as follows. The primal and dual complexes are three-dimensional, 6-connected lattices. A three dimensional complex is defined as a set C=(V,E,F) with vertices (nodes) v$\chi$V, edges e$\chi$E $\nabla \times$V and faces f$\chi$F E×E×E×E (for 6-connected lattices). Let n=|V| and m=|E|, where | | denotes cardinality. Nodes, edges and faces will all be indexed by single subscripts. A weighting assigns a value to each edge called a weight. The weight of an edge, $e_i$, is denoted by $w_i$ and considered herein to be nonnegative. An oriented complex is one for which each structure is additionally assigned an ordering of its constituent vertices. The orientation corresponds to a "direction" of an edge or a "clockwise" or "counterclockwise" orientation of a face. A face and a bordering edge are said to have coherent orientation if the ordering given by the edge orientation is found in the orientation of the face. Since the faces of a 6-connected lattice are degenerate simplices, the standard "even parity" definition of orientation is inappropriate. Consider an orientation of a face, represented by column b indicating a signed membership of each edge to the face, as valid if Ab=0, where A is defined herein below. Clearly, b may take a positive or negative sign while fulfilling this condition, which may be interpreted here as opposite orientations. A face is coherently oriented with a bordering edge if the edge "points" in the same direction as the "clockwise" or "counterclockwise" traversal of the face. In the context of image processing, nodes are associated with data elements, e.g., pixels or voxels, and edges define a neighborhood relation. A 6-connected lattice can be taken to have a face on every "square" of the lattice. Orientations should be assigned consistently, but may be assigned arbitrarily. An example orientation would be to orient all edges to point from nodes with smaller coordinates to nodes with larger coordinates and to orient each face in a clockwise manner, relative to a particular view of the lattice.

The idea of duality plays a role in graph theory, in which a dual graph is defined from a planar graph by replacing each face with a dual node and connecting two nodes if their respective faces share an edge. A primal graph is defined as the initial planar graph and the dual graph is defined as the result of the duality operation. In general, given a k-simplex in p-dimensions, its dual will be a p-k simplex.

FIGS. 1(a)-(d) illustrate the relationship between the primal and dual complexes in two and three dimensions. FIG. 1(a) depicts primal and dual structures for a 2D, 4-connected lattice. FIG. 1(b) depicts the primal (black) and dual (gray) 2D lattices. FIG. 1(c) depicts primal and dual structures for a 3D, 6-connected lattice. FIG. 1(d) depicts the primal (black) and dual (gray) 3D lattices. Treating the primal lattice as the image volume, the edges of the dual lattice define a separating boundary of the pixels in 2D. In contrast, the faces of the dual lattice are required to "box in" the voxels of the primal lattice in 3D.

The duality operation naturally produces an "outside face". Although the outside face can be assigned to a single node in the dual graph, it can alternatively be subdivided into cells for two reasons: (1) a lattice is easier to work with computationally; and (2) the addition of weighted extra edges/faces on the outside allow for a higher cost to be assigned to a longer path/surface enclosing the border pixels/voxels.

Duality offers a convenient taxonomy of graph-based segmentation algorithms. There are two basic types of graph-based segmentation algorithm: (1) implicit boundary algorithms and (2) explicit boundary algorithms. Implicit boundary algorithms, such as graph cuts or normalized cuts, label each node (pixel) as foreground/background and imply the boundary between them by the labeling. In contrast, explicit boundary algorithms, such as intelligent scissors, identify the boundary explicitly and implicitly define a foreground/background labeling. The notion of duality provides a convenient may of viewing these segmentation algorithms in which one may treat the image data as existing at the nodes of the primal lattice. In this framework, implicit boundary algorithms operate on the primal lattice while explicit boundary algorithms operate on the dual lattice. Therefore, the components of the dual lattice are used to "box-in" the pixels in the primal lattice, such as edges/paths in 2D or faces in 3D.

However, as illustrated in FIGS. 1(a)-(d), the corresponding dual lattice changes with dimension while the primal lattice remains constant, prompting the need to modify explicit boundary algorithms. The explicit boundary approach given by intelligent scissors must be redeveloped for each dimension. Specifically, the intelligent scissors approach fixes points along the boundary in the dual lattice and seeks a minimal path that includes three endpoints. Since the shortest path algorithm used in the 2D case is inappropriate to find a bounding surface in 3D, a minimum-weight surface can be used.

Graph-based segmentation algorithms typically focus on cutting a weighted graph, with weights given on the primal edges via a function of the intensity, e.g., $$w_i = \exp(-\beta(I_j - I_k)^2) \text{ for } \{v_j, v_k\} \in e_i,$$

where $I_j$ indicates the image (volume) intensity at voxel $v_j$. The minimum path problem is equivalent to finding an optimal solution of $$\min_y Q(y) = \sum_i w_i y_i,$$

where $y_i$ represents an indicator vector on the set of edges, with $y_i=1$ indicating that edge $e_i$ belongs to the path and $y_i=0$ indicating that edge $e_i$ does not belong to the path.

In the absence of constraints, the above minimization yields a vector of $y_i=0$ $\forall e_i \in E$, since all weights are nonnegative. Type II constraints may be introduced by specifying endpoints for the path. A succinct formulation of Type II constraints is given by $$Ay=p,$$

where p is a vector of all zeros except for a $p_s=1$ and $p_t=-1$, for endpoints $\{v_s, v_t\}$. The matrix A is the node-edge incidence matrix defined by $$A_{v,e} = \begin{cases} +1 & \text{if the vertex appearars first in the edge orientation,} \\ -1 & \text{if the vertex appearars second in the edge orientation,} \\ 0 \end{cases}$$

The node-edge incidence matrix plays the role of a boundary operator that takes as input an edge path (indicated by y) and returns the nodal boundary of that path (fixed by p). The boundary operator permits the path boundary to be fixed and succinctly express the Type II constraints for the minimal path system.

In order to pass from minimal paths to a minimum-weight surface, one increases the dimensionality of the above formulation. The dimensionality of the minimal path problem may be increased simply by using the dimension-appropriate incidence matrix (boundary operator) and boundary vector p. In other words, given the boundary of a two-dimensional surface (i.e., a closed contour or series of closed contours), one wishes to find the minimum-weight two-dimensional surface with the prescribed boundary. This is a minimum-weight surface system with Type II conditions.

In this dimension-increased system, the incidence matrix (boundary operator) in question is the edge-face incidence matrix defined as $$B_{e,f} = \begin{cases} +1 & \text{if the edge borders the face with coherent orientation,} \\ -1 & \text{if the edge borders the face with anti-coherent orientation,} \\ 0 & \text{otherwise.} \end{cases}$$

Instead of the lower-dimension boundary vector, p, the vector r is used as an indicator vector of a closed, oriented contour taking values if the edge $e_i$ belongs to the contour with coherent orientation, if the edge $e_i$ belongs to the contour with anti-coherent orientation, otherwise.

$$r_i = \begin{cases} +1 \\ -1 \\ 0 \end{cases}$$

Therefore, finding a minimum-weight surface is equivalent to solving $$\min_z Q(z) = \sum_i w_i z_i$$

subject to $$Bz = r,$$

where z is an indicator vector indicating whether or not a face is present in the minimum-weight surface and $w_i$ indicates the weight of a face. Since the faces in the primal lattice, where the image data is located, correspond to edges in the dual lattice, the intensity function $w_i = \exp(-\beta(I_j - I_k)^2)$ can be used dual lattice edges to define the face weights. Recall that a node in the primal lattice is associated with an image voxel, and a node value in the primal lattice is just the intensity associated with that voxel. In transforming from the primal lattice to the dual lattice, a node is transformed into a volume, and the value of the dual space volume can be regarded as being associated with a point at the center of the volume. According to an embodiment of the invention, edge weights in the dual lattice can then be determined by the differences of the center point values using the standard weight definition, above.

A generic linear programming optimization scheme can be used to solve the shortest path system $$\min_y Q(y) = \sum_i w_i y_i$$

where Ay=p, despite the fact that the solution y is strictly binary valued because the node-edge incidence matrix is always totally unimodular. Recall that a matrix is totally unimodular when the determinant of all submatrices takes one of the values {−1, 0, 1.} Using a totally unimodular matrix as the constraint matrix for a linear programming problem (with an integer-valued right hand side) will always produce integer valued solutions. In order to solve the minimum-weight surface system $$\min_z Q(z) = \sum_i w_i z_i$$

where Bz=r with a generic linear programming method, it needs to be determined (1) under what conditions a given r will produce a solution, and (2) whether the solution is guaranteed to be an integer solution.

With regard to the first issue, it can be shown that if the edge-face incidence matrix has m−n+1 independent columns and a nonzero vector r satisfying Ar=0, then $$\min_z Q(z) = \sum_i w_i z_i$$

is guaranteed to have a solution. In particular, the node-edge incidence matrix is known to have a right nullspace of rank m−n+1. Furthermore, since the boundary of a boundary is zero: AB=0, and the edge-face incidence matrix has m−n+1 independent columns, then the edge-face incidence matrix spans the right nullspace. In other words, if Ar=0, then r may be expressed as a linear combination (with constants c) of the columns of the edge-face incidence matrix r=Bc. In the context of image segmentation on a 6-connected lattice, the above conditions will hold and therefore the issue of feasibility is settled.

Regarding the issue of integrality, if $$r = Bz_0$$

then the constraints $$Bz = r$$

may be reformulated as $$B(z - z_0) = 0.$$

Therefore, the vector $(z - z_0)$ lies in the right nullspace of B. The right nullspace of the face-edge incidence matrix is known to be the volume-face incidence matrix, C, defined as $$C_{ij} = \begin{cases} +1 & \text{if volume } j \text{ includes face } i \text{ in the positive orientation,} \\ -1 & \text{if volume } j \text{ includes face } i \text{ in the negative orientation,} \\ 0 & \text{otherwise.} \end{cases}$$

That is, there exists some vector v for which $Cv = z - z_0$. Thus, the constraint Bz=r can be rewritten as $-Cv + z = z_0$.

In fact, according to an embodiment of the invention, the entire system may be rewritten in terms of the variable v as $$\min_v w^T(Cv + z_0) = w^T Cv$$

(since $z_0$ is constant, it doesn't factor into the minimization)

subject to:

-Cv<=$z_0$ (since z>=0, as stated in the original problem)

and v>=0

(an arbitrary constant may be added to v, while satisfying the first condition since, for constant vector, k, Ck=0).

For any cellular embedding, for which each volume shares exactly one face with another volume with opposite orientation (of which the 6-connected lattice is an example), then C is the edge-node incidence matrix for the primal lattice and is therefore totally unimodular. In other words, v is guaranteed to be integral and therefore z=$z_0$+Cv must also be integral, since $z_0$ and C are integral.

Thus, it can be seen that the shortest path system can be generalized to a minimum weight surface system that can be solved through the application of a generic linear programming solver. This linear programming system takes as input a closed contour (or series of closed contours) and returns a minimum-weight surface. Since closed contours are the output of a standard (2D) intelligent scissors method, according to an embodiment of the invention, the outputs of the 2D intelligent scissors provide the inputs for a 3D intelligent scissors. Alternately, according to another embodiment of the invention, another 2D segmentation algorithm could also be used to produce the inputs to the minimum-weight surface system.

It should be noted that a segmentation system and method according to an embodiment of the invention can be applied to 3D object segmentation in higher dimensional data. An exemplary, non-limiting higher dimensional system is a 4D dataset comprising a sequence of 3D datasets sampled through time, wherein one can define 2D contours to obtain 3D object boundaries.

It should be further noted that the shortest path optimization includes two equations for each edge in order to reflect the possibility that a path could traverse that edge in either direction, wherein each undirected edge is broken into two directed edges. This same construction can be followed in the formulation of the minimum-weight surface system. In this system, each face is replicated as two faces with opposite orientation. Note that a pair of faces with opposite orientation have identical entries in the edge-face incidence matrix, except for a sign change. Explicitly including faces of both orientations results in a linear programming system with 6(k+1)$k^2$ equations for a k×k×k lattice.

Figure 2:
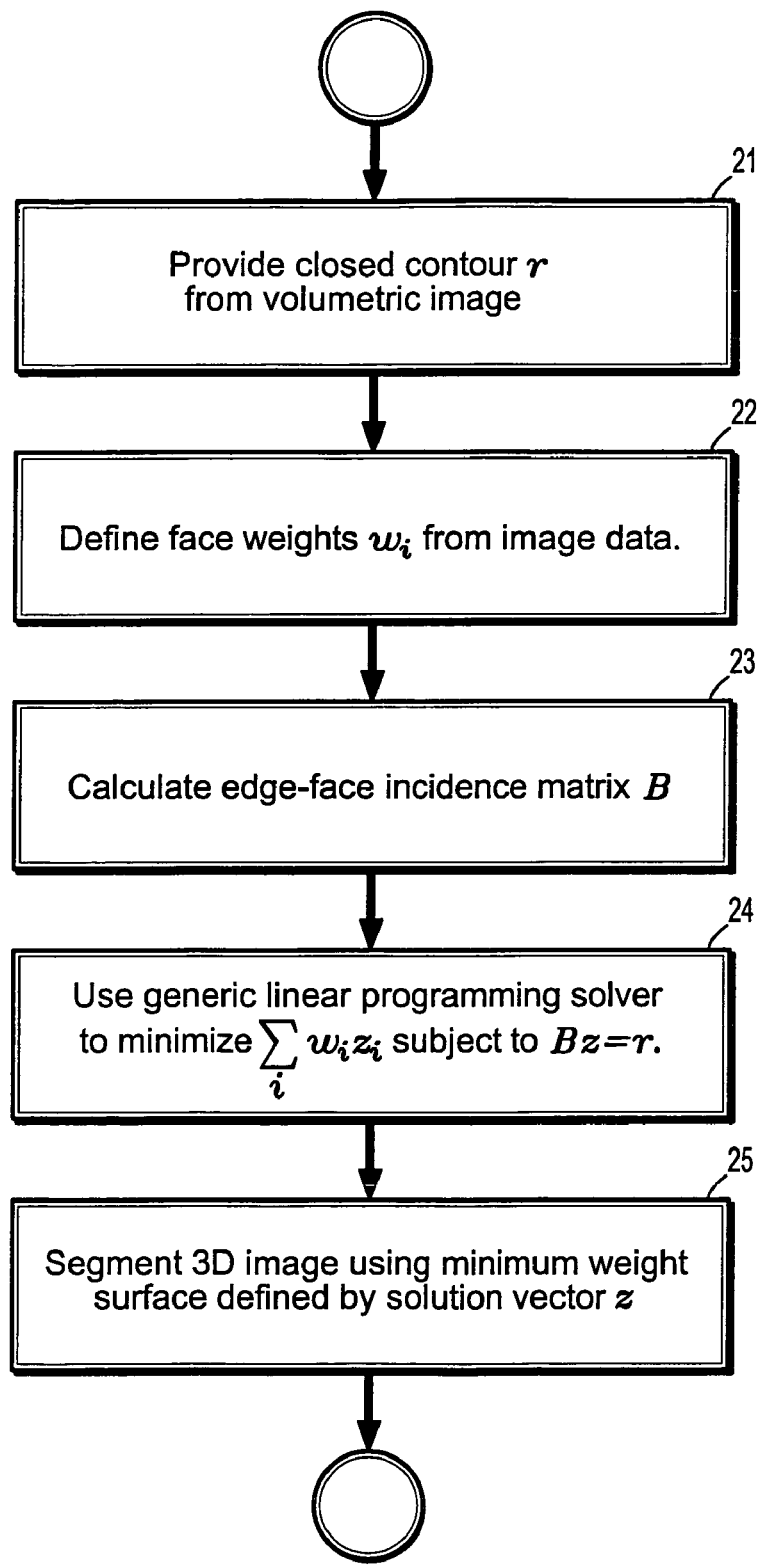
FIG. 2 depicts a flowchart of a segmentation algorithm according to an embodiment of the invention.

A flowchart of a segmentation algorithm according to an embodiment of the invention that finds an exact minimum-weight surface in 3D weighted graphs is depicted in FIG. 2. Referring now to the flowchart, the algorithm begins at step 21 by obtaining an oriented closed contour on one or more slices of a volumetric image from an outside algorithm. One exemplary, non-limiting algorithm is a 2D intelligent scissors algorithm. This contour specifies the Type II boundary condition and is represented in the equation Bz=r by vector r. At step 22, face weights are defined from the image content using $w_i$=exp(-β($I_j$-$I_k$)$^2$)). Note that "outside" faces can be assigned to an arbitrary value. According to a non-limiting embodiment of the invention, w=0.5 on the outside faces. At step 23, the edge-face incidence matrix $B_{e,f}$={+1, -1, 0} is calculated as defined above. A generic linear programming solver is used at step 34 to minimize $$\min_z Q(z) = \sum_i w_i z_i$$

subject to Bz=r using the r defined in step 21 and the matrix B defined in step 23. At step 25, the 2D minimum-weight surface separating the 3D regions is obtained from the solution vector z that indicates the faces that form the minimum weight surface, given the prescribed boundaries.

The correctness of an algorithm according to an embodiment of the invention has been verified on both synthetic data and the segmentation of real 3D data. Three examples of synthetic data have demonstrated correctness. First, a black sphere in a white background was segmented, given an initial contour around one parallel. Second, the same sphere was segmented using a boundary of contours around two parallels (i.e., a contour given on two slices). Finally, a "lunchbox" shape was segmented given a medial contour. This experiment shows that an algorithm according to an embodiment of the invention correctly handles topological changes.

Figure 3:
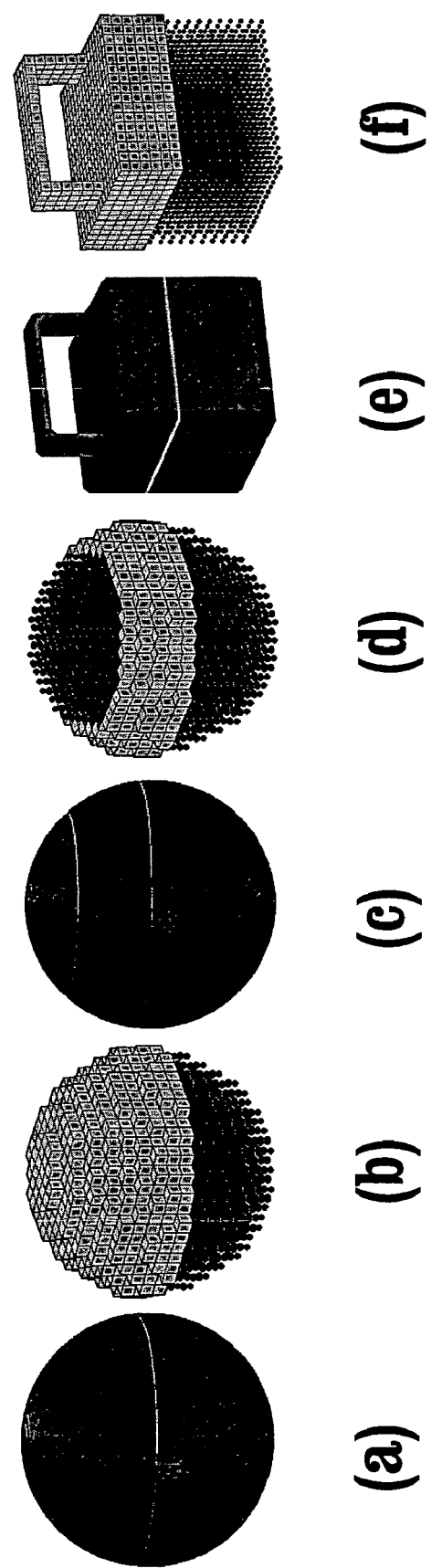
FIGS. 3(a)-(f) depict synthetic examples to illustrate correctness of an algorithm according to an embodiment of the invention.

FIGS. 3(a)-(f) depict synthetic examples to illustrate correctness of an algorithm according to an embodiment of the invention. Each successive pair of images depicts, respectively from left to right, a rendering of the original object (with the input contours) along with an algorithm output. The input volumes all had black voxels indicating voxels belonging to the object and white voxels indicating background. The white stripe(s) in each of the rendered views shows the input contour(s). In the solution visualizations, black dots are plotted at the center of the black (object) voxels and faces are shown to indicate the computed surface. FIGS. 3(a)-(b) show a sphere with an input contour along a parallel. Note that a single boundary input (contour) is sufficient to define a solution. However, the minimum weight surface may not be unique. FIGS. 3(c)-(d) shows a sphere with input contours at two parallels of different heights. FIGS. 3(e)-(f) shows a lunchbox shape with a handle on the top and a medial contour input. An algorithm according to an embodiment of the invention can correctly find minimal surfaces with topological changes.

Note that the minimum-weight surface will not necessarily equal the solution to the minimal surface problem in a continuous, Euclidean space. For example, the solution to the continuous minimal surface is a catenoid when given a boundary of two, identical, closed contours at different heights. In contrast, the minimum-weight surface is a cylinder when the underlying complex is a 6-connected graph. This contrast between the discrete and continuous domains is analogous to the fact that the shortest path on a lattice will not necessarily be the same as a straight line in the plane.

The application of minimum weight surfaces with Type II boundary conditions to the segmentation of real data is illustrated in the context of image segmentation (i.e., as a 3D extension of intelligent scissors). Two 3D datasets were used in these experiments: SPECT cardiac data and CT cardiac data. Type II boundary conditions (closed contours) were generated using standard intelligent scissors on two slices of each dataset, and the minimum-weight surface that had these contours as a boundary was computed.

Figure 4:
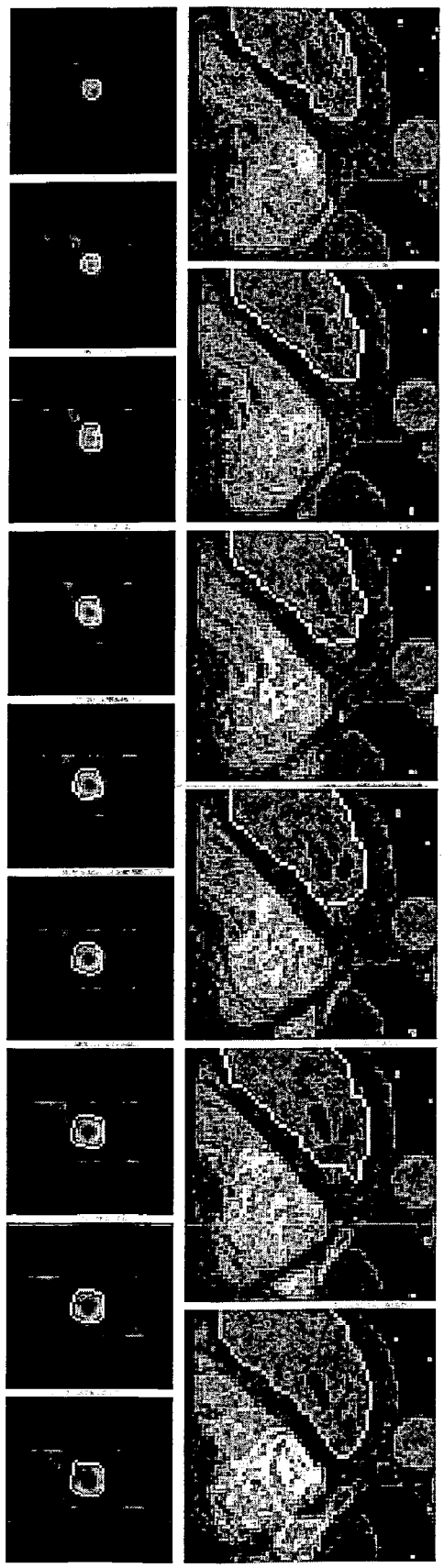
FIG. 4 illustrates the application of a minimum-weight surface segmentation algorithm according to an embodiment of the invention to segmentation of 3D data.

FIG. 4 illustrates the application of a minimum-weight surface segmentation algorithm according to an embodiment of the invention to segmentation of 3D data. The images in the top row depict SPECT cardiac data, while the images in the bottom row depict CT cardiac data. In both studies, the gray contours were placed on the left and right slices and the intermediate white contours represent the minimum-weight surface between these contours. This figure demonstrates that an algorithm according to an embodiment of the invention behaves as expected for a minimal surface approach to 3D segmentation.

It is to be understood that the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

Figure 5:
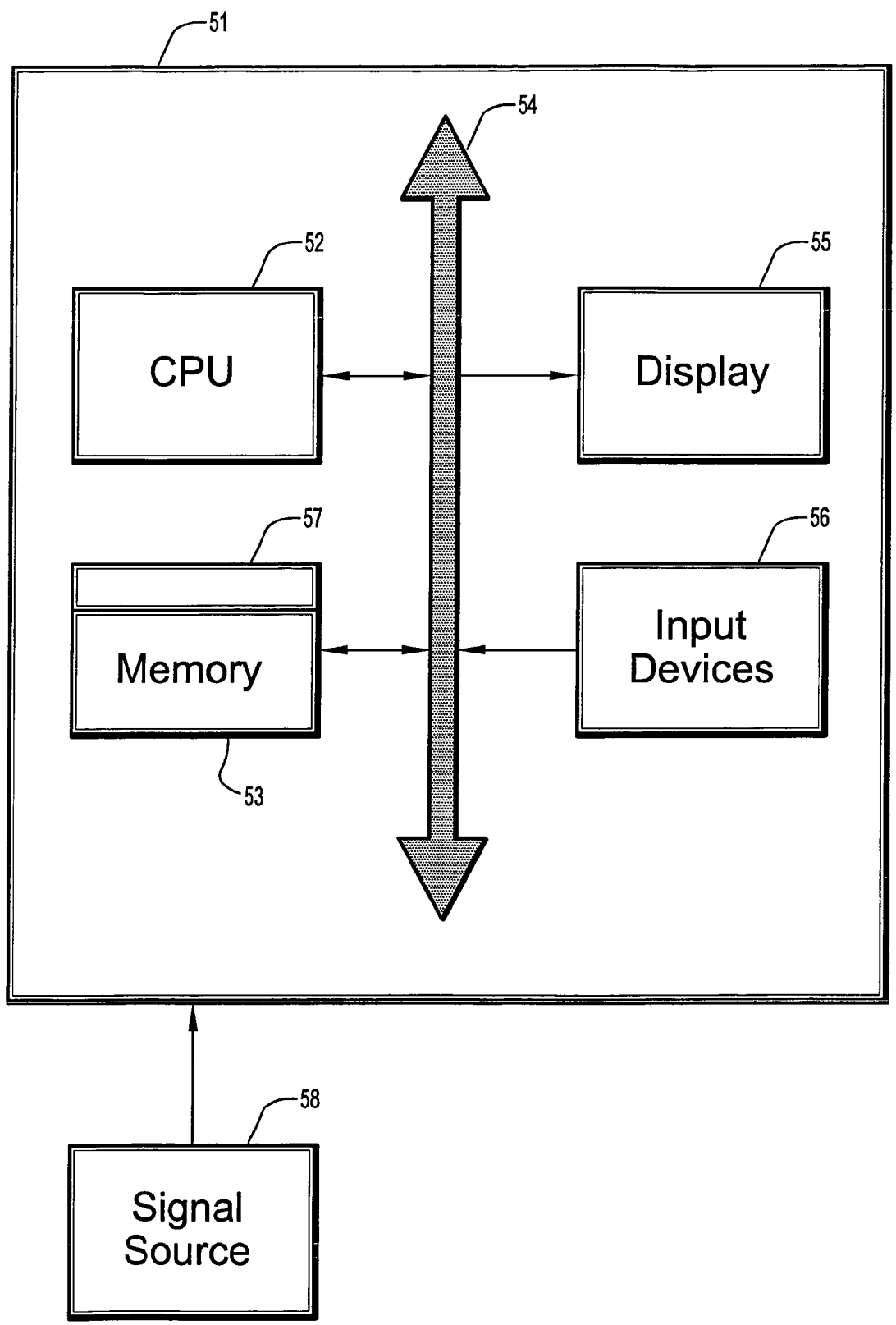
FIG. 5 is a block diagram of an exemplary computer system for implementing a minimum-weight surface segmentation algorithm, according to an embodiment of the invention.

FIG. 5 is a block diagram of an exemplary computer system for implementing a minimum-weight surface segmentation algorithm according to an embodiment of the invention. Referring now to FIG. 5, a computer system 51 for implementing an embodiment of the present invention can comprise, inter alia, a central processing unit (CPU) 52, a memory 53 and an input/output (I/O) interface 54. The computer system 51 is generally coupled through the I/O interface 54 to a display 55 and various input devices 56 such as a mouse and a keyboard. The support circuits can include circuits such as cache, power supplies, clock circuits, and a communication bus. The memory 53 can include random access memory (RAM), read only memory (ROM), disk drive, tape drive, etc., or a combinations thereof. The present invention can be implemented as a routine 57 that is stored in memory 53 and executed by the CPU 52 to process the signal from the signal source 58. As such, the computer system 51 is a general purpose computer system that becomes a specific purpose computer system when executing the routine 57 of the present invention.

The computer system 51 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

While the present invention has been described in detail with reference to a preferred embodiment, those skilled in the art will appreciate that various modifications and substitutions can be made thereto without departing from the spirit and scope of the invention as set forth in the appended claims.

What is claimed is:

1. A method for 3D volume segmentation in digitized medical images comprising the steps of:
providing a digitized medical 3D image, said image comprising a plurality of intensities corresponding to a domain of points on an N-dimensional lattice;
obtaining an oriented closed 2-dimensional contour on one or more 2-dimensional slices from said image;
defining face weights w from said image intensities by forming a dual lattice of said image lattice;
minimizing $$\sum_i w_i z_i$$

summed over all faces subject to the constraint Bz=r wherein vector z is an indicator vector indicating whether a face is present in a minimum-weight surface, vector r is an indicator vector of said 2-D contour, and wherein B is an edge-face incidence matrix; and
segmenting said 3-D image into distinct regions separated by the minimum-weight surface indicated by said vector z.

2. The method of claim 1, wherein the weight of an outside face is assigned arbitrarily.

3. The method of claim 1, wherein said edge-face incidence matrix B is defined by $$B_{e,f} = \begin{cases} +1 & \text{if the edge borders the face with coherent orientation,} \\ -1 & \text{if the edge borders the face with anti-coherent orientation,} \\ 0 & \text{otherwise.} \end{cases}$$

4. The method of claim 1, wherein said contour indicator vector r is defined by $$r_i = \begin{cases} +1 & \text{if the edge } e_i \text{ belongs to the contour with coherent orientation,} \\ -1 & \text{if the edge } e_i \text{ belongs to the contour with anti-coherent orientation,} \\ 0 & \text{otherwise.} \end{cases}$$

5. The method of claim 1, wherein every point in said primal lattice is associated with a volume in said dual lattice, and further comprising associating the intensity value of each primal lattice point with a point at the center of the corresponding dual lattice volume.

6. The method of claim 5, wherein said weights $w_i$ are proportional to $\exp(-\beta(I_j-I_k)^2)$, wherein $I_j$ and $I_k$ represent the values associated with dual lattice points j and k, respectively, and $\beta$ is a predefined constant.

7. The method of claim 1, wherein the minimization of $$\sum_i w_i z_i$$

subject to Bz=r is performed by a linear programming solver.

8. The method of claim 1, further comprising obtaining a plurality of contours from said image, wherein each said contour extends over one or more 2-dimensional slices in said image, and wherein said vector r is an indicator vector for all of said plurality of contours.

9. A method for 3D volume segmentation in digitized medical images comprising the steps of:
providing a digitized medical 3D image, said image comprising a plurality of intensities corresponding to a domain of points on an N-dimensional lattice;

obtaining one or more 2-dimensional closed contours from said image;

forming a dual lattice from said image, wherein every point is said dual lattice is associated with a point of said image and said value associated with a dual lattice point is the intensity associated with said image point;

defining face weights w proportional to $\exp(-\beta(I_j-I_k)^2)$, wherein $I_j$ and $I_k$ represent the values associated with dual lattice points j and k, respectively, and $\beta$ is a predefined constant;

forming a minimum-weight surface from said face weights having said one or more contours as boundaries; and segmenting said 3-D image into distinct regions separated by said minimum-weight surface.

10. The method of claim 9, wherein each said closed contour is oriented.

11. The method of claim 9, wherein each said closed contour extends over one or more 2-dimensional slices in said image.

12. The method of claim 9, wherein forming a minimum-weight surface further comprises minimizing $$\sum_i w_i z_i$$

summed over all faces subject to the constraint $Bz=r$ wherein vector z is an indicator vector indicating whether a face is present in said minimum-weight surface, vector r is an indicator vector of said one or more 2-D contours, and wherein B is an edge-face incidence matrix.

13. The method of claim 9, wherein said one or more contours are obtained from a 2-dimensional segmentation procedure.

14. A program storage device readable by a computer, tangibly embodying a program of instructions executable by the computer to perform the method steps for 3D volume segmentation in digitized medical images, said method comprising the steps of:

providing a digitized medical 3D image, said image comprising a plurality of intensities corresponding to a domain of points on an N-dimensional lattice;

obtaining an oriented closed 2-dimensional contour on one or more 2-dimensional slices from said image;

defining face weights w from said image intensities by forming a dual lattice of said image lattice;

minimizing $$\sum_i w_i z_i$$

summed over all faces subject to the constraint $Bz=r$ wherein vector z is an indicator vector indicating whether a face is present in a minimum-weight surface, vector r is an indicator vector of said 2-D contour, and wherein B is an edge-face incidence matrix; and segmenting said 3-D image into distinct regions separated by the minimum-weight surface indicated by said vector z.

15. The computer readable program storage device of claim 14, wherein the weight of an outside face is assigned arbitrarily.

16. The computer readable program storage device of claim 14, wherein said edge-face incidence matrix B is defined by $$B_{e,f} = \begin{cases} +1 & \text{if the edge borders the face with coherent orientation,} \\ -1 & \text{if the edge borders the face with anti-coherent orientation,} \\ 0 & \text{otherwise.} \end{cases}$$

17. The computer readable program storage device of claim 14, wherein said contour indicator vector r is defined by $$r_i = \begin{cases} +1 & \text{if the edge } e_i \text{ belongs to the contour with coherent orientation,} \\ -1 & \text{if the edge } e_i \text{ belongs to the contour with anti-coherent orientation,} \\ 0 & \text{otherwise.} \end{cases}$$

18. The computer readable program storage device of claim 14, wherein every point in said primal lattice is associated with a volume in said dual lattice, and further comprising associating the intensity value of each primal lattice point with a point at the center of the corresponding dual lattice volume.

19. The computer readable program storage device of claim 18, wherein said weights $w_i$ are proportional to $\exp(-\beta(I_j-I_k)^2)$, wherein $I_j$ and $I_k$ represent the values associated with dual lattice points j and k, respectively, and $\beta$ is a predefined constant.

20. The computer readable program storage device of claim 14, wherein the minimization of $$\sum_i w_i z_i$$

subject to $Bz=r$ is performed by a linear programming solver.

21. The computer readable program storage device of claim 14, the method further comprising obtaining a plurality of contours from said image, wherein each said contour extends over one or more 2-dimensional slices in said image, and wherein said vector r is an indicator vector for all of said plurality of contours.

* * * * *

UNITED STATES PATENT AND TRADEMARK OFFICE
CERTIFICATE OF CORRECTION

PATENT NO. : 7,653,243 B2
APPLICATION NO. : 11/511524
DATED : January 26, 2010
INVENTOR(S) : Leo Grady Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 821 days.

Signed and Sealed this

Twenty-third Day of November, 2010

David J. Kappos
*Director of the United States Patent and Trademark Office*